United States Patent
Dejoux

[11] 3,888,572
[45] June 10, 1975

[54] METHOD AND APPARATUS FOR MAKING ANIMATED CARTOONS

[75] Inventor: Jean Veran Dejoux, Los Angeles, Calif.

[73] Assignee: Optical Systems Corporation, Los Angeles, Calif.

[22] Filed: Apr. 21, 1971

[21] Appl. No.: 135,931

[52] U.S. Cl.................................. 352/87; 352/51
[51] Int. Cl...................... G03b 19/18; G03b 21/32
[58] Field of Search............. 352/51, 87, 86; 353/37

[56] References Cited
UNITED STATES PATENTS

| | | |
|---|---|---|
| 3,271,097 | 9/1966 | Montremy et al. ............... 352/51 X |
| 3,506,343 | 4/1970 | Dejoux................................. 352/87 |

Primary Examiner—Samuel S. Matthews
Assistant Examiner—Russell E. Adams, Jr.
Attorney, Agent, or Firm—Nichol M. Sandoe

[57] ABSTRACT

A method and apparatus for making animated cartoons includes a drawing table having at least two windows at each of which the image of a preceding picture may be projected as a guide for drawing a subsequent picture, and having a third window of larger size at which magnified images of sequences of pairs of pictures may be projected in superposed relation for viewing for inspection and correction.

4 Claims, 3 Drawing Figures

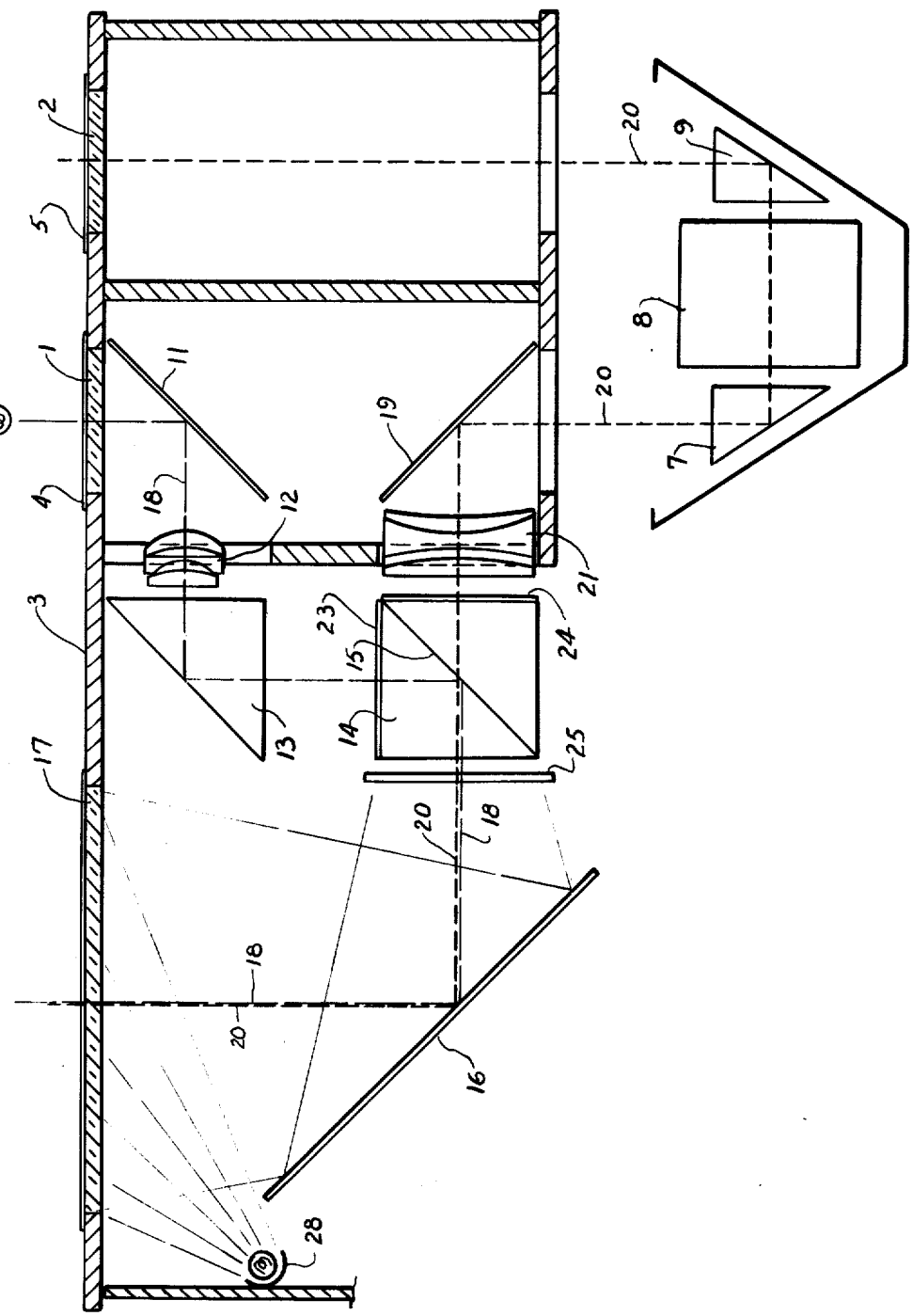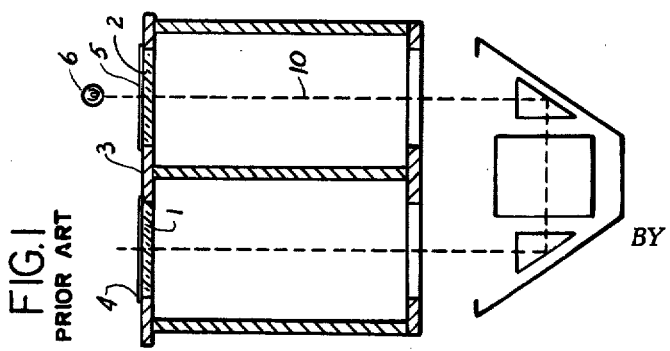

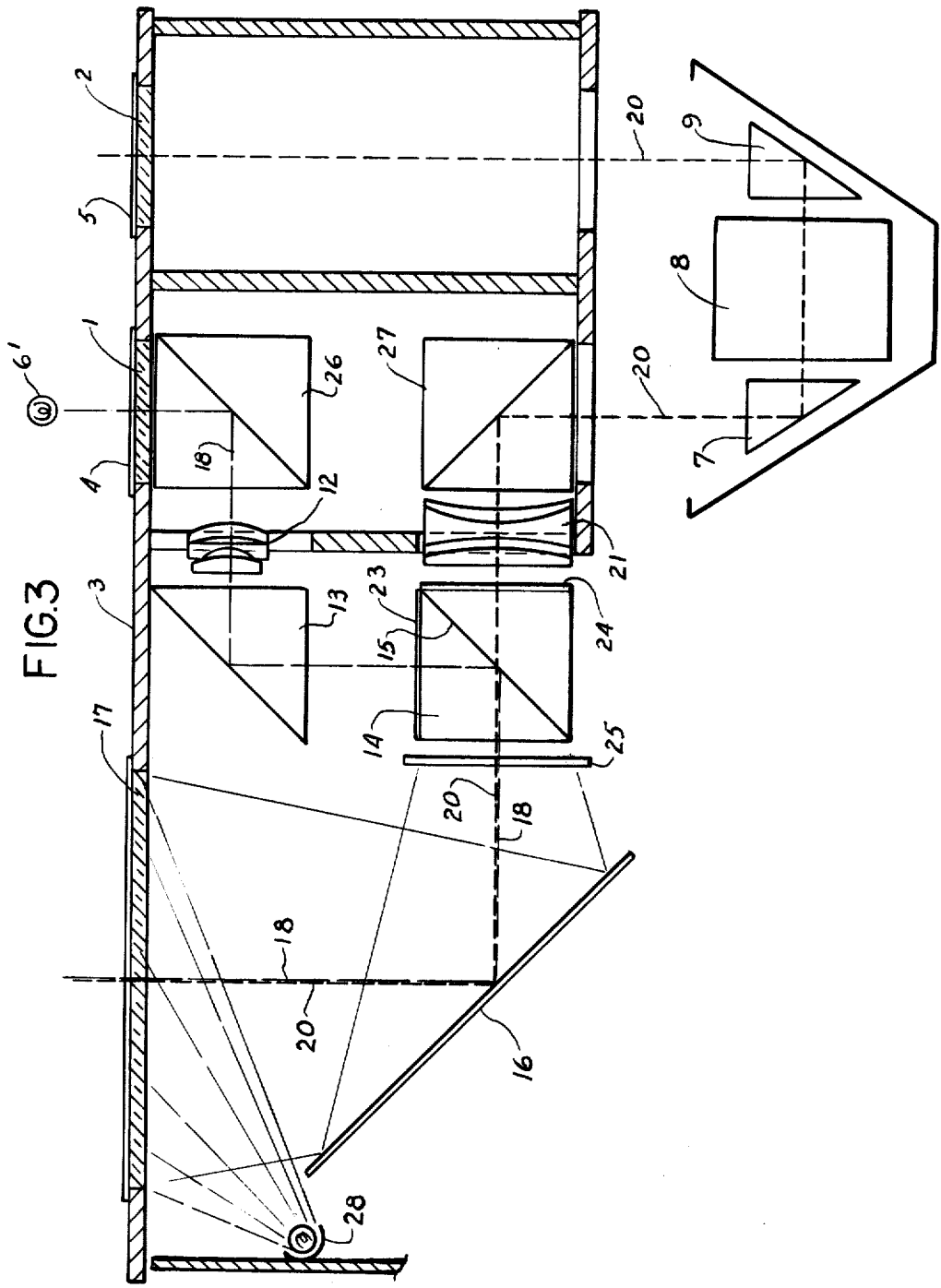

METHOD AND APPARATUS FOR MAKING ANIMATED CARTOONS

This invention relates to methods and apparatus for making animated cartoons in which the artist draws a sequence of pictures directly on a sequence of film frames, and in which provision is made for immediate playback of a sequence of pictures on an enlarged scale so that the artist may immediately observe the results of his work and make changes or corrections, if necessary.

In U.S. Pat. No. 3,271,097 in which I am co-inventor with Jean de Montremy, there is described a method and apparatus for making animated cartoons in which two separate film strips are mounted to be fed step by step over the surfaces of two separate frosted glass windows constituting drawing stations where an artist may draw pictures within the film frames. Provision is made for projecting the image of a picture drawn in the frame of a film strip which is located over either of said windows onto a frame of a film strip which is located over the other of said windows. The projecting system comprises suitable lenses and prisms to project the said images erect, unreversed and in the same size as the original pictures. Thereby, after a first picture has been drawn at one window, it becomes possible for the artist to derive a second picture from the projected image of the first by projecting it onto a frame at the other window where the second picture is to be drawn. Thereafter, after advancing the first film strip to bring another frame over the first window, it is possible to project the image of the second picture onto that frame, so that the artist may then derive a third picture from the projected image of the second, and so on.

In my later U.S. Pat. No. 3,506,343 there is described an improved method and apparatus for making animated cartoons which utilizes the basic principle of the earlier patent but which makes it possible for the artist to draw pictures in any sequence of his choice, and which makes it possible to draw a sequence of pictures on either a single film strip or on two film strips.

In U.S. Pat. No. 3,271,097, a method and apparatus for projecting such an animated sequence of pictures for viewing is described. A separate projector unit is provided and any completed sequence may be transported from the drawing unit to the projecting unit for viewing. After viewing, the sequence may be transported back into the drawing unit for correction, if desired.

It is an object of the present invention to provide for immediate playback of any completed sequence of pictures for viewing within the drawing unit itself, thus avoiding the need to transport the film back and forth between a drawing unit and a projecting unit.

It is a further object of the invention to provide for the projection of an enlarged image during playback in order to enable the artist to discover imperfections which might go unnoticed in projected images the same size as the original pictures.

Other objects and advantages of the invention will appear hereinafter.

A preferred embodiment of the invention selected for purposes of illustration is shown in the accompanying drawings, in which, FIG. 1 shows, in semi-diagrammatic form, the essentials of a drawing unit in accordance with the principles of U.S. Pat. No. 3,271,097.

FIG. 2 shows the unit of FIG. 1 with the addition of apparatus according to the present invention.

FIG. 3 shows a modified form.

According to the present invention, when it is desired to play back a sequence of pictures which have been drawn the images of two pictures are projected simultaneously along separate paths and said images are magnified separately. Then the paths of the magnified images are caused to converge in such manner that the separate paths coincide, and the two enlarged images are then projected in superposed relation on a projection surface. In this manner, any pair of pictures may be projected together for inspection and correction. However by utilizing the method of projection described in U.S. Pat. No. 3,271,097, entire sequences may be played back for inspection.

Referring to FIG. 1 of the drawings, two windows 1 and 2 are provided in a table 3 across which film strips may be moved intermittently. Between successive movements the strips are held stationary with a frame 4 in register with window 1 and a frame 5 in register with window 2. Light source 6 is mounted above the windows in such manner as to be movable to direct light through either window. As shown in FIG. 1 it is located above window 2.

As thus illustrated, the artist may draw a picture on the frame 4. If the light source 6 is then moved to a position above window 1, the image is projected downwardly to the prism 7 which directs it horizontally through a lens system 8 to prism 9 which directs it upwardly where it is focussed on the frame 5. The artist may now draw a second picture on the frame 5 which is derived from the projected image of the first. The path of the projected image is indicated by the dotted line 10. Thereafter by moving the light source 6 back to its original position above window 2, the second picture may now be similarly projected and focussed on a new frame exposed at window 1, and so on until the desired sequence has been completed.

FIG. 2, also in semi-diagrammatic form, shows the foregoing apparatus as supplemented and modified by the apparatus of the present invention. Thus, a mirror 11 arranged to intercept an image projected from frame 4 at an angle of 45° reflects the image through a magnifying lens system 12 to a reflector prism 13 which, in turn, reflects it downwardly to a beam splitter 14, the angled interface 15 of which again reflects it to mirror 16 which reflects it upwardly to be focussed at the frosted glass surface of the large window 17 in the table 3 which may be positioned relatively closely to the windows 4 and 5. The path of the projected image is indicated by the dash line 18.

A second mirror 19 is arranged to intercept an image projected from frame 5 along the path indicated by dotted line 10. As shown, the image is first reflected by the prism 9 through lens system 8, and it is then reflected upwardly by prism 7 toward mirror 19. It is then reflected by the mirror 19 to pass through the magnifying lens system 21, and thence through the beam splitter 14 to mirror 16 which reflects it upwardly to be focussed at the large window 17.

The enlarged images produced by the magnifying lens systems 12 and 21 are, of course, such that the images projected from the frames 4 and 5 respectively are precisely the same size and are projected in superposed relation. The magnification may be of any desired value. For example, if the drawings are made on frames of 70 mm. film, a magnification of about 3 to 1 has been found adequate to produce an enlarged image of sufficient size and clarity to permit satisfactory viewing and inspection. For such films, the windows 1 and 2 may be approximately 3.011 inches by 2.27 inches and the window 17 may be 9.033 inches by 6.81 inches.

The film strip may be advanced intermittently across the windows 1 and 2 by conventional sprocket mechanisms, with the frames at the windows 1 and 2 being advanced alternately. For projection, two light sources 6 and 6' are preferably provided, one for each of the windows 1 and 2.

Projection of the pictures onto the frosted glass surface of window 17 is by the dissolve method described in U.S. Pat. No. 3,271,097 to which reference is made for further explanation. For this purpose, fixed polarizing screens or filters, oriented in opposite directions, are located in the paths of the respective images projected from the frames 4 and 5. Such screens 23 and 24 may conveniently be located on appropriate faces of the beam splitter 14 as shown. The necessary rotating polarizing screen 25 may then be mounted between the beam splitter 14 and the mirror 16 for rotation on an axis coinciding with the central axis of the image path. The screen 25 will be rotated in synchronism with the film feed mechanism in any desired manner.

Preferably, all of the supplemental apparatus including mirrors 11 and 19, magnifying lens systems 12 and 21, prism 13, beam splitter 14 and polarizing screens 23, 24, rotating screen 25 and mirror 16 are all mounted in a sliding drawer which may be slid to the left (as shown in FIG. 2) so that the drawing of the sequence of pictures may proceed as described in U.S. Pat. No. 3,271,097. Then, when the artist desires to project a sequence for inspection, he simply slides the drawer to the right to the position of FIG. 2.

In FIG. 3, however, a modified arrangement is shown in which the supplemental apparatus remains in place permanently and need not be removed while the artist is drawing. In this arrangement, the mirrors 11 and 19 are replaced by beam splitters 26 and 27, thus making it possible for a picture drawn at either of the windows 1 or 2 to be projected at the other window.

As an added feature of the invention, a source of light 28 may be arranged below and to one side of the window 17 in such manner as to illuminate the under side of the window. If now, a drawing or picture on an opaque surface is placed under the window so as to be illuminated by the light source, an image of the picture thereon will be reflected by the mirror 16 through the beam splitter 14, from which split images will be projected at each of the windows 1 and 2. If the said picture represents a background or stationary object which is to appear in a sequence of pictures, the projected image enables the artist to draw the animation in proper relation thereto.

I claim as my invention:

1. Apparatus for making animated cartoons and for viewing enlarged images of sequences thereof, comprising, a drawing table having at least two drawing windows therein of equal dimensions, and another viewing window therein of enlarged dimensions which are multiples of the corresponding dimensions of said drawing windows, means for projecting onto said viewing window of enlarged dimensions equally enlarged images of film frames exposed at each of said first windows, said enlarged images being projected onto said viewing window in superposed relation, which said means includes two separate magnifying lens systems, one of which enlarges the image projected from one of said drawing windows, and the other of which enlarges the image projected from the other of said drawing windows, a beam splitter, means for causing an enlarged image projected from one of said first windows to enter one side of said beam splitter and to be reflected to emerge at right angles to the entrance direction, and means for causing an enlarged image projected from the other of said first windows to enter another side of said beam splitter at right angles to said first side to emerge on an axis coinciding with the axis of said first enlarged image, and a mirror adapted to intercept the coinciding images emerging from said beam splitter to reflect them onto said window of enlarged dimensions.

2. Apparatus for making animated cartoons and for viewing enlarged images of sequences thereof, comprising, a drawing table having at least two drawing windows therein of equal dimensions, and another viewing window therein of enlarged dimensions which are multiples of the corresponding dimensions of said drawing windows, means for projecting onto said viewing window of enlarged dimensions equally enlarged images of film frames exposed at each of said first windows, said enlarged images being projected onto said viewing window in superposed relation, which said means includes two separate magnifying lens systems, one of which enlarges the image projected from one of said drawing windows, and the other of which enlarges the image projected from the other of said drawing windows, a reflecting means adapted to intercept an image projected from one of said windows and to reflect it into one of said magnifying lens systems, a second reflecting means adapted to intercept an image projected from the other of said windows and to reflect it into the other of said magnifying lens systems, and a beam splitter, means for reflecting the enlarged image emerging from said one magnifying lens system into one side of said beam splitter to be reflected to emerge therefrom at right angles to the entrance direction, said other reflecting means being arranged to cause the image reflected therefrom to pass through said second magnifying lens system and to enter another side of said beam splitter at right angles to said first side on an axis coinciding with the axis of said first enlarged image.

3. Apparatus as claimed in claim 2 including a reflecting means adapted to intercept the coinciding images emerging from said beam splitter to reflect them onto said window of enlarged dimensions.

4. Apparatus as claimed in claim 3 in which said two magnifying lens systems, said first and second reflecting means, said beam splitter, said means for reflecting the enlarged image emerging from said first magnifying lens system into said beam splitter and said reflecting means for reflecting the coinciding images onto said window of enlarged dimensions are all mounted as a unit for movement into and out of position to enable said first and second reflecting means to intercept images projected from said two windows.

* * * * *